United States Patent [19]

Belinkoff et al.

[11] 4,450,758
[45] May 29, 1984

[54] ROTARY COOKING DEVICE

[76] Inventors: Irving R. Belinkoff, 80-65 231st St., Bellerose Manor, N.Y. 11427; Bruno Satkunas, 7 Oak Ridge Ave., Summit, N.J. 07901

[21] Appl. No.: 336,998

[22] Filed: Jan. 4, 1982

[51] Int. Cl.³ .................................................. A47J 27/62
[52] U.S. Cl. .................................... 99/332; 99/341; 99/348; 99/427; 215/236
[58] Field of Search ............... 99/332, 333, 341, 348, 99/443 R, 427, 331; 215/236

[56] References Cited

U.S. PATENT DOCUMENTS

| | | | |
|---|---|---|---|
| 1,786,877 | 12/1930 | Thompson | 99/348 X |
| 4,048,473 | 9/1977 | Burkhart | 99/348 X |
| 4,120,981 | 10/1978 | Burkhart | 99/348 X |
| 4,173,925 | 11/1979 | Leon | 99/348 |
| 4,304,177 | 12/1981 | Loeffler et al. | 99/333 |

FOREIGN PATENT DOCUMENTS

| | | | |
|---|---|---|---|
| 29027 | 10/1884 | Fed. Rep. of Germany | 215/236 |
| 1733 | 10/1888 | Sweden | 215/236 |
| 360512 | 11/1931 | United Kingdom | 215/236 |

*Primary Examiner*—Billy J. Wilhite
*Assistant Examiner*—Christine A. Peterson
*Attorney, Agent, or Firm*—Richard J. Hammond

[57] ABSTRACT

An improvement in an automatic cooking apparatus having a rotating wide-mouthed vessel closed with a lid and driven from the end opposite the open end of the vessel. Heating means are provided along a portion of the vessel circumference and are controlled to maintain food contained within the vessel at a predetermined temperature for a preset time. Means are provided to supply a predetermined quantity of heat to the cooking vessel without the need for a temperature sensing means.

7 Claims, 16 Drawing Figures

ROTARY COOKING DEVICE

This invention relates to an improved food cooking apparatus and more particularly to apparatus of the type wherein the food to be cooked is placed within a rotating vessel that is exposed to an external heat source to produce a predetermined temperature within the vessel for a preset time.

The ability to precisely control the temperature of foods being cooked as well as the time of cooking them has long been recognized as the ultimate goal in preparing foods simply, economically and consistently well. Since foods being cooked represent a mass (i.e., a liquid of varying viscosity, a solid, or a mixture of these) of generally poor heat transfer qualities, it is also necessary for their successful preparation to be able to achieve uniform heating throughout the mass, normally by stirring. Additionally, in some cooking protocols it is sometimes necessary or desirable to achieve a predetermined temperature cycling, e.g., slow or rapid heating followed by a period of uniform temperature and terminated by slow or rapid cooling. Such protocols are difficult if not impossible to achieve for the average cook.

In U.S. Pat. Nos. 4,048,473 and 4,120,981 there are disclosed a cooking machine and a cooking method designed to cook a wide variety of foods rapidly, simply, efficiently, tastefully and largely automatically. The apparatus and method disclosed in U.S. Pat. Nos. 4,048,473 and 4,120,981 attain a uniform desired temperature throughout the food mass, eliminate stirring, and make possible the preparation of such diverse dishes as beef stroganoff, asparagus with hollandaise sauce, french fried potatoes, egg dishes and souffles to be cooked as one-step operations.

The cooking machine of this prior art comprises a rotatable, inclined cooking vessel having a removable cap with a central, vapor discharging opening near which or through which a temperature probe is located. The vessel is rotated past a heating element by an electric motor. A timing mechanism initiated by signals from the temperature probe turns off the electric motor and heating element after a preset time.

Two apparatus embodiments are illustrated in U.S. Pat. No. 4,048,473. In the first of these, shown in FIGS. 1-5 of the patent, the cooking vessel is placed within an essentially closed cylindrical housing having a small window for viewing the vessel contents during cooking. The vessel is supported within the housing on bearings at its capped end and by the drive motor shaft keyed to its bottom end. Thus, although the vessel has an adequate support during rotation, it is difficult to visually inspect the food during cooking, and to remove the hot vessel from the housing when cooking is complete. Further it is necessary to hold the vessel, normally with both hands, in moving it and discharging its contents.

The second apparatus embodiment of U.S. Pat. No. 4,048,473, shown in FIGS. 6-8 of that patent, provides a heat reflective housing supporting heating coils and enveloping up to about 120° of the circumference of the cooking vessel. The vessel is supported on two idler wheels and two motor driven gears driving a central gear affixed to the cap of the vessel. The vessel may have a dovetail ring affixed to its external surface to which a handle may be attached when the vessel is not rotating. Thus, although this second embodiment makes it possible to use a glass cooking vessel that permits full visual inspection of the food contained within, this advantage is achieved at the expense of an adequate, stable support system; for the two idler wheels and the two gears provide assurance that the hot vessel and its contents would remain safely positioned and not be subject to dislodgment by bumping or jarring. A ring is disclosed for attaching a handle, but this involves the necessity to keep at hand a loose part as well as the need to perform another step in the use of the cooking apparatus.

Therefore, although the cooker embodiments of U.S. Pat. No. 4,048,473, provide the means for efficiently cooking all manner of foods, the apparatus does not possess a preferred combination of features: visual inspection of the food while cooking; a stable, sturdy and accident-proof support system for the cooking vessel; and a permanent continuously cool handle means for ease of engaging and disengaging the cooking vessel and driving means and for moving the cooking vessel from place to place.

It is therefore a primary object of this invention to provide an improved general purpose cooker capable of cooking a wide range of foods easily, reliably and automatically by rotating the food in a vessel while heating its contents and applying a predetermined amount of heat over a predetermined time to the food for cooking. It is another object to provide a cooker of the character described which may incorporate a transparent cooking vessel (formed, for example, of glass) permitting visual inspection of the cooking process and which has a reliable, automatically alignable locking support means for the vessel. It is yet another object to provide such a locking support means which incorporates a rotatable pivot-assembly arm mounted on the housing of the cooker and engaging a pivot plate accepting means located on the lid of the cooking vessel which permits the cooking vessel to be put into and taken from the cooker and to be moved around without touching the surface of the vessel. An additional object is to provide means associated with the handle to retain the vessel in the basket frame means while pouring from the vessel.

Another primary object of the invention is to provide a cooker of the character described which comprises a single compact unit, which protectively seals off the driving means and all electronic circuitry from cooking vapors and which is easily washed. Yet another object is to provide an automatic cooker which permits the ready exchange of cooking vessels so that different courses or different parts of a single course can be cooked successively.

Still another primary object of this invention is to provide an automatic cooker having accurate control of cooking times and temperatures without employing a themocouple for sensing cooking food temperature and being capable of carrying out a preset cooking protocol. An additional object is to provide such an automatic cooker incorporating a programmable temperature/elapsed time control means such that once the ingredients of a recipe are charged into the cooking vessel a single actuation of the apparatus will suffice to perform the protocol.

Other objects of the invention will in part be obvious and will in part be apparent hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which.

According to one aspect of the present invention, there is provided an automatic food cooker comprising an open mouthed, rotatable cooking vessel; driving means to rotate said vessel; vessel lid means having at least one vent opening therethrough, through which gases may escape from the interior of said cooking vessel; housing means comprising a drive housing end in which a driving means is located and heater housing means configured to envelope at least a portion of the circumference of said cooking vessel; vessel heating means mounted in said heater housing means; temperature controller means operatively connected to said vessel heating means for controlling said heater means to vary the temperature of said vessel by applying heat thereto; and a base supporting said housing means for detachably receiving and supporting said vessel, the improvement comprising a coupling means located on the cooking vessel end opposite the open end of said cooking vessel; plate means attached to said driving means and engageable with said coupling means; pivot assembly means extending from said housing means and engageable with a pivot accepting means positioned on said vessel lid means; and a programmable temperature/elapsed time control means for controlling said heater means thereby controllably supplying a predetermined quantity of heat over a predetermined period of time to said cooking vessel.

Figure 1:
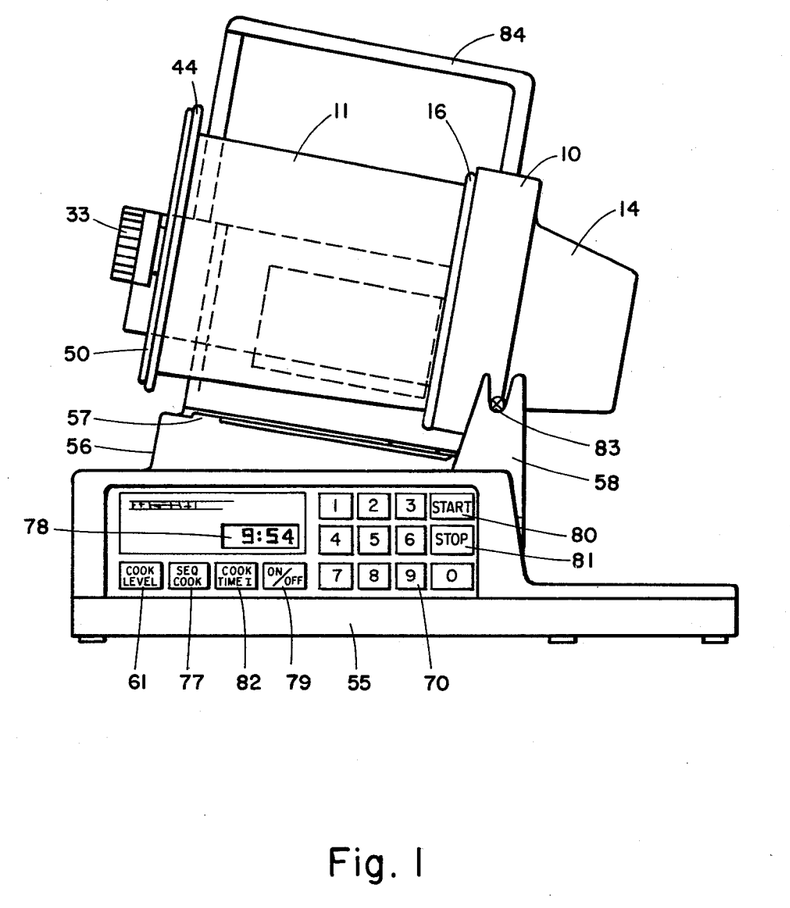
FIG. 1, is a rotary cooker, side elevational view.

FIG. 1 is a side elevational view of one embodiment of the automatic cooker of this invention. Since the various components of this cooker embodiment are shown in FIGS. 2–15, in which the same reference numerals are used to identify the same components and their parts, reference should also be had to those figures. The cooker of FIG. 1 is formed of a housing means 10, a wide-mouthed cooking vessel 11, a pivot plate housing cover 33 connected to the housing means and a control system housing 55 which supports the housing means 10 and thereby also the cooking vessel 11 and the pivot plate housing cover 33.

Figure 2:
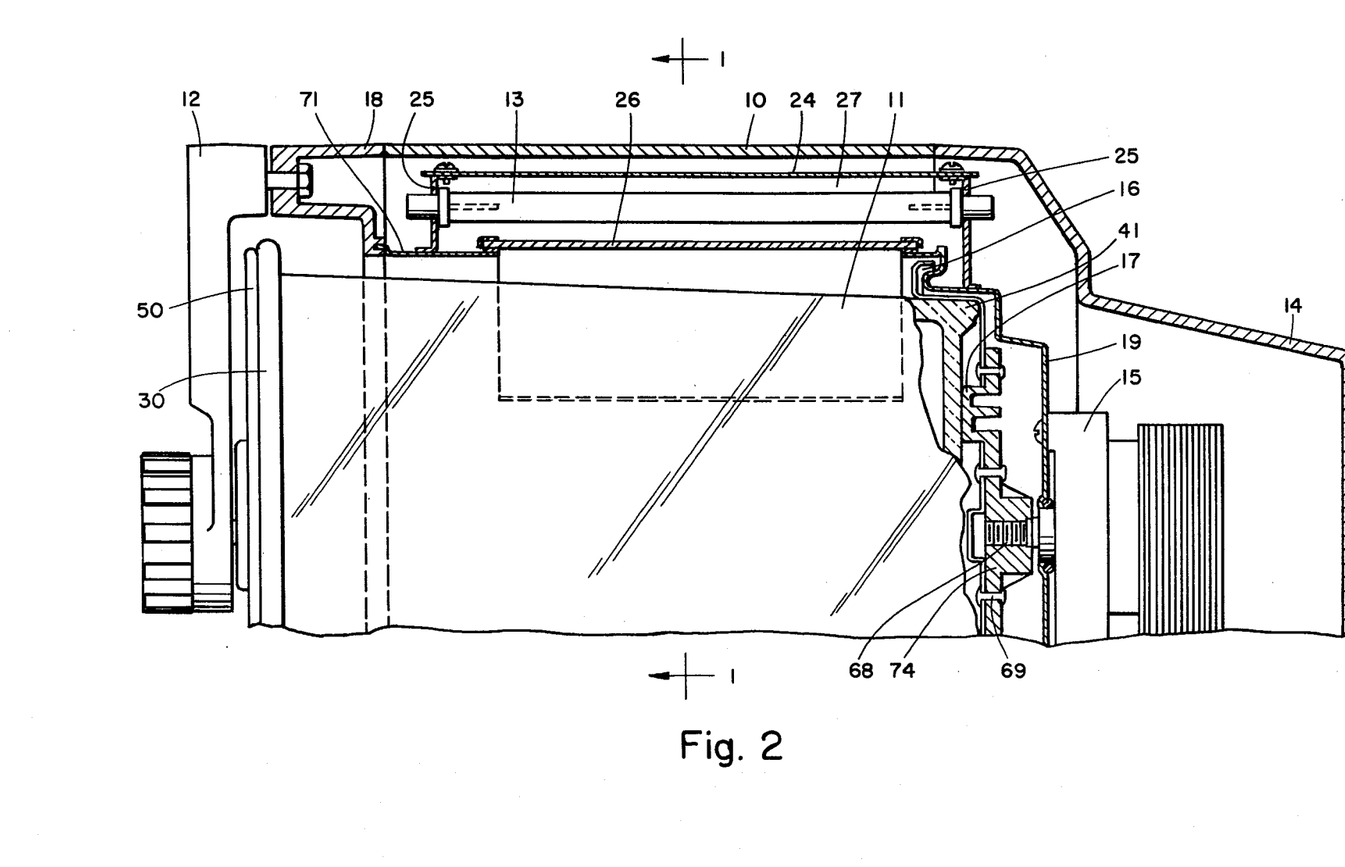
FIG. 2, is a rotary cooker heater and drive housing including cooking vessel, partial cross sectional top view.
Figure 3:
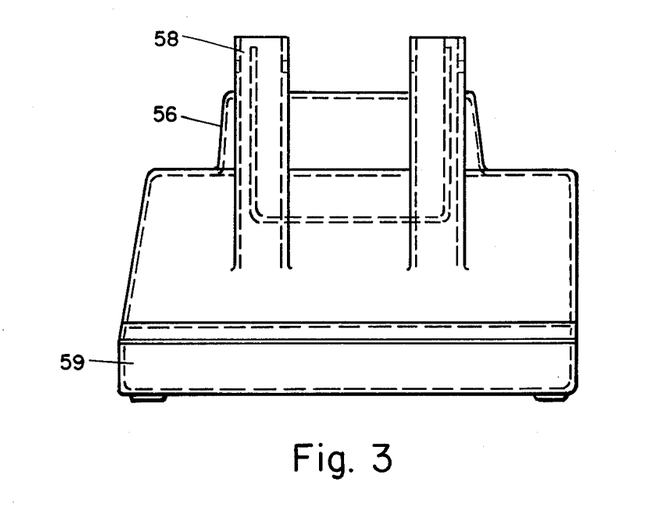
FIG. 3, is a rotary cooker base cross-sectional end view along line 2—2.
Figure 12:
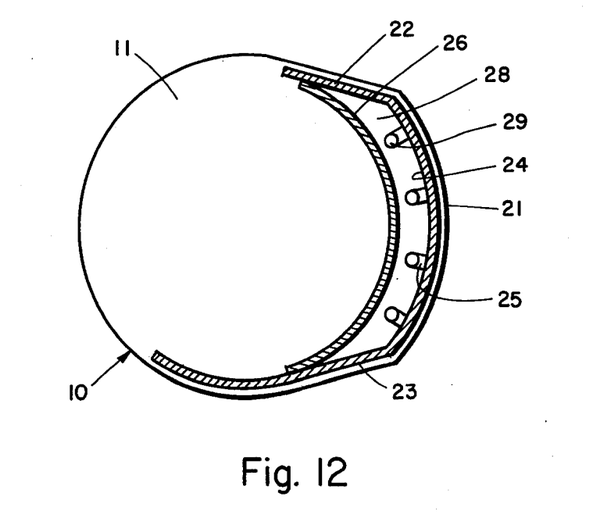
FIG. 12, is a rotary cooker heater housing including cooking vessel, full view of FIG. 2 along line 1—1.

Referring to FIGS. 2 and 12, housing means 10 comprises pivot means support 18, supporting pivot means 12 which has secured thereto a pivot means assembly 30. The housing means 10, opposite the cooking vessel 11 is configured to envelope up to about 180° of the circumference of the cooking vessel 11 when such is placed in the housing. As can be seen in the traverse cross sectional view FIG. 12, the portion of the housing means is formed of an outer arcuate section 21 with an upper extension wall 22 and a lower extension wall 23. The internal surface 24 of arcuate section 21 is heat reflective. At the two ends of the 180° configured section are arcuate bands 25 (left and right) defining a section of an essentially annular spacing 27 with housing means 10, and walls 22 and 23. A slotted support plate 28 is positioned within this spacing to provide means to support heating element 28. These heating elements are preferably of the type which rapidly develop radiant heat. Quartz tubes with Nichrome wires embedded therein are illustrative of such heaters. Because of the spread of heating elements shown in FIG. 12, heat is supplied both directly and by reflection to the contents of cooking vessel 11 over something less than about 90° as the vessel rotates. This configuration can be altered to achieve more or less than 90° for the area of heat application.

Figure 4:
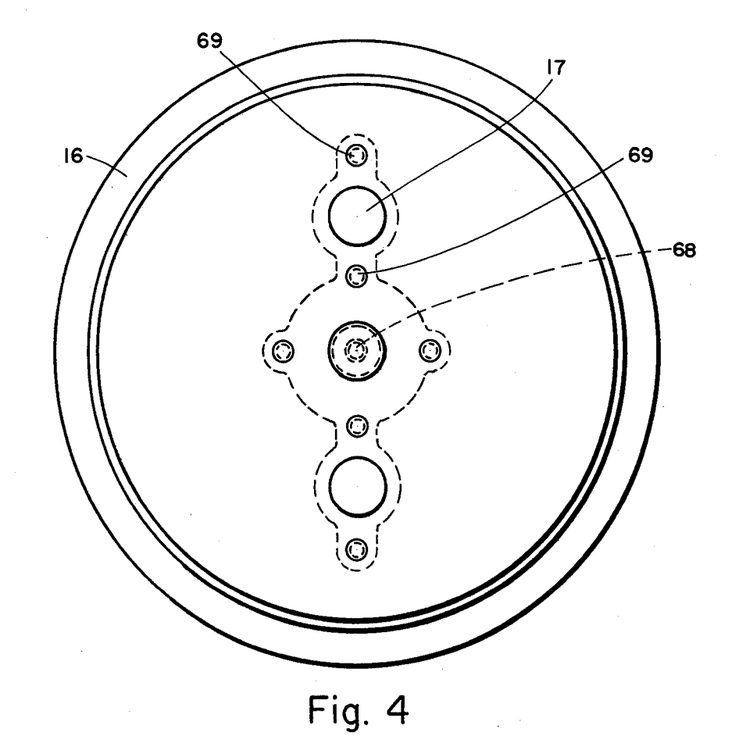
FIG. 4, is cooking vessel drive cap, top elevational view.

Referring to FIGS. 2 and 4, the housing means 10 has at the end opposite the pivot means 12 a motor drive housing which encloses the drive motor 15 held in place by motor mounting plate 19 which is attached to housing means 10 through heat diffusion means support 71. Power to drive such motor is supplied by electrical conduit 73 shown in FIG. 15. Mounted on the drive shaft 68 of drive motor 15 is cooking vessel drive cup 16 which is attached to the drive shaft 68 by means of drive plate 74 by way of drive cup locking means 69. As shown in FIG. 4, drive cup 16 has multiple drive segments 17 which project upward from the drive cup 16 and engage the wide mouth cooking vessel at its base. The drive segments 17, typically of an elastomeric substance, usually rubber, can be secured to the drive cup surface or may project through apertures in the drive cup from the drive plate as shown in FIG. 2. In the preferred embodiment they are formed as an integral part of a molded (thermoplastic) drive plate, thereby eliminating the need for attachment to the drive cup.

As illustrated in FIGS. 2, 8, 9 and 10 rotatably attached by swing arm connector 54 to pivot means support 18 is a swing arm 53 which holds and supports the pivot plate housing 34. This housing is partially covered by pivot plate housing cover 33 which contains a cylindrical channel for the pivot plate guide 74. The pivot plate housing encloses a spring loaded pivot plate 31, the pivot plate being held within the pivot plate housing 34 by retaining ring 38. The retaining ring 38 is attached to the pivot plate shaft 75 and rests on the shoulder of the pivot plate shaft guide 76. The pivot plate housing 34 is held in place within the pivot plate housing cover 33 by means of retaining ring 37. In operation, the pivot plate lid contact projection 32 engages the pivot plate accepting means 47 affixed to the lid 50 of the wide-mouthed cooking vessel 11, (FIG. 14) thereby urging the pivot plate 31 rearwardly, which in turn urges the pivot plate guide away from the pivot plate guide retaining pin 39 compressing guide spring 36. The rearward movement is halted when the pivot plate guide contacts the pivot plate stop 40 which may be a part of pivot plate housing 34. Upon disengagement from the pivot plate accepting means, the spring 36 restores the plate guide and plate to their former position.

Figure 11:
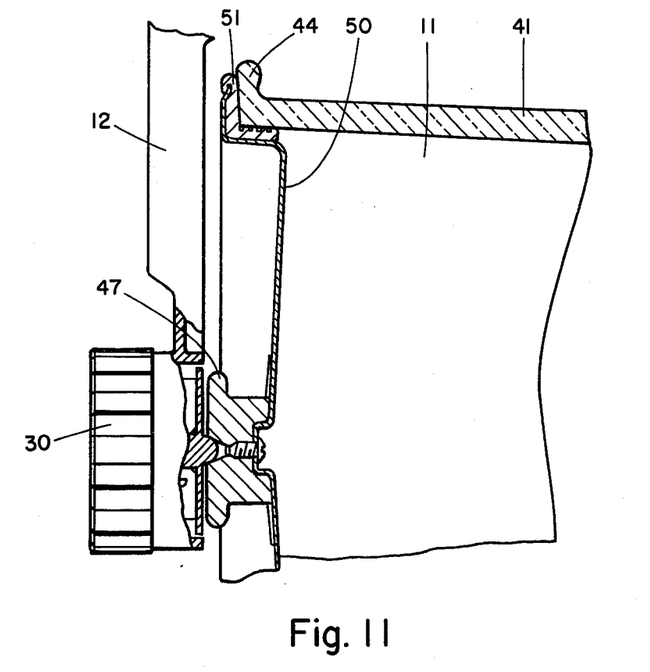
FIG. 11, is a rotary cooker swing arm engaging the pivot plate accepting means of cooking vessel lid, partial side elevational view.
Figure 13:
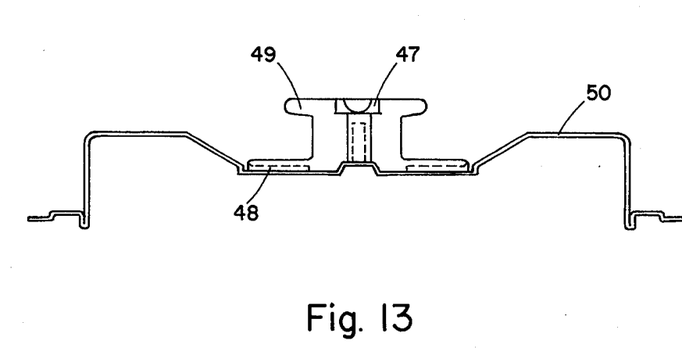
FIG. 13, is a cooking vessel lid, partial cross-sectional side elevational view.
Figure 14:
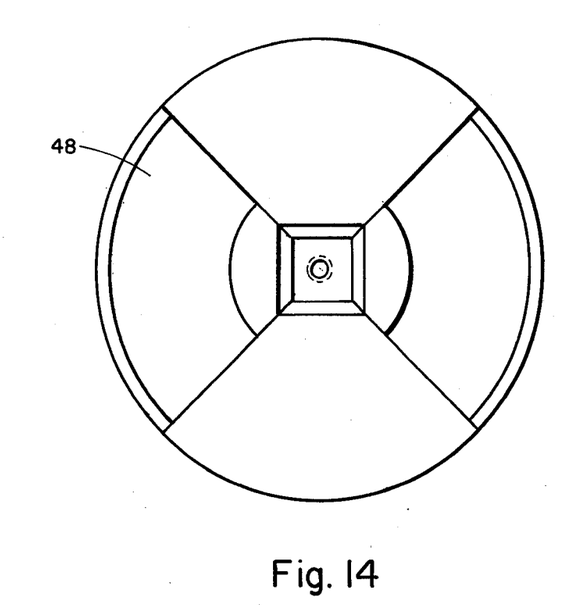
FIG. 14, is a cooking vessel lid handle, bottom elevational view.

Referring now to FIGS. 11, 13 and 14, as disclosed above, in operation the pivot plate lid contact projection 32 engages pivot plate accepting means 47. This accepting means is formed within vessel lid handle 49 which is in turn secured to or part of vessel lid 50. As can be seen in FIGS. 13 and 14, wide shallow channels 48 are cut into the vessel lid handle 49 which extend to the end of such handle opening the interior of the cooking vessel when the vessel lid is in place in the cooking vessel to the atmosphere thereby providing a means for the escape of vapors from cooking foods within the vessel. It is important to note that unlike the prior art, the lid of this invention is not pierced through by a thermocouple for sensing the temperature of the contents of the cooking vessel during heating. Since no probe is used, leaks from the vessel's interior are minimized.

Figure 5:
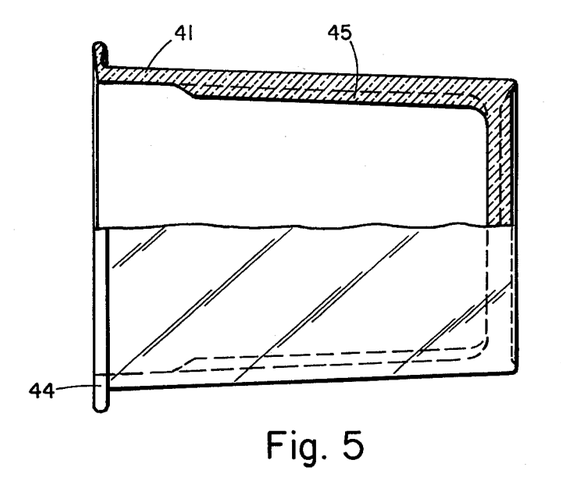
FIG. 5, is a rotary cooker cooking vessel, side elevational view partially cut away.
Figures 6, 7:
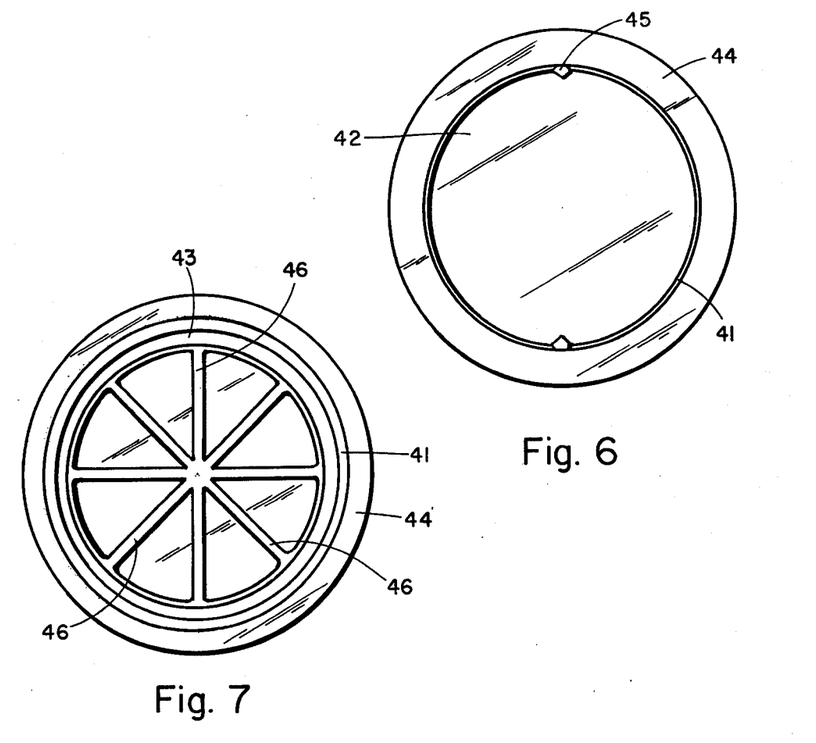
FIG. 6, is a cooking vessel of FIG. 5, top elevational view.
FIG. 7, is a cooking vessel of FIG. 5, bottom elevational view.
Figure 8:
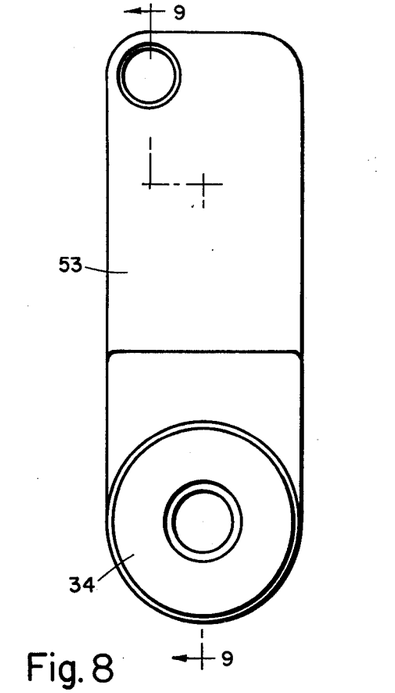
FIG. 8, is a rotary cooker swing arm, top elevational view.
Figure 9:
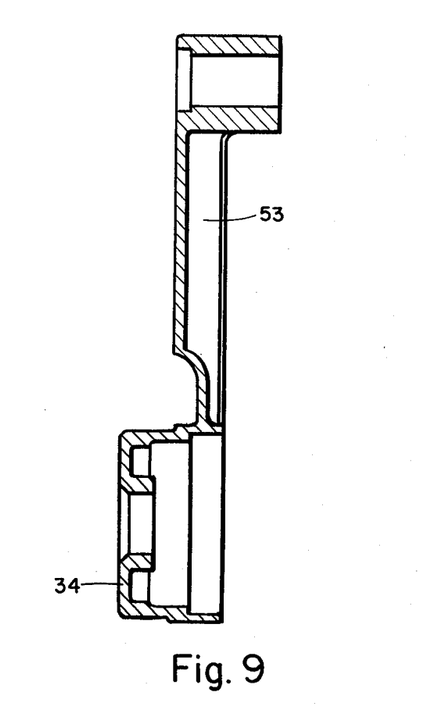
FIG. 9, is a swing arm of FIG. 8, cross sectional side view along line 8—8.
Figure 10:
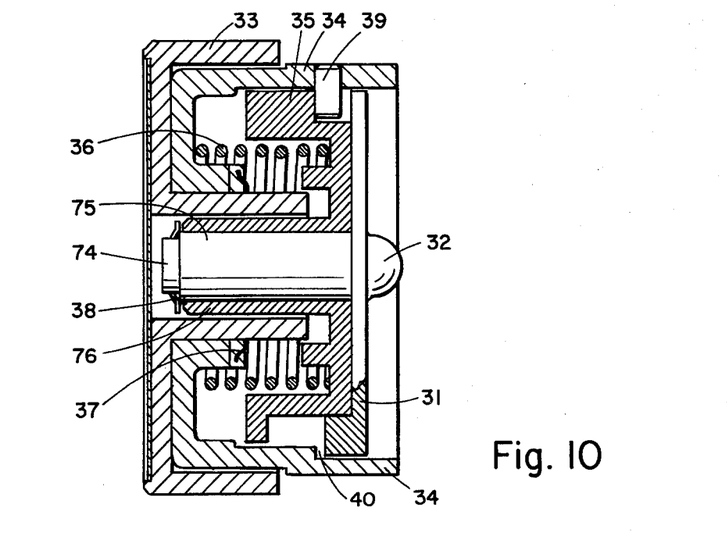
FIG. 10, is a pivot means assembly, cross sectional side elevational view.

Cooking vessel 11 as shown in cross section in FIGS. 5, 6 and 7 is preferably of the wide mouth type preferably formed of a transparent material such as heat resistant glass. The vessel preferably has a pronounced flange 44, which can be used to grip and move the vessel while placing it in the housing or removing it after the cooking cycle has been completed. Two longitudinal (or helical) internal bands 45 serve to provide means to tumble and agitate the contents of the vessel while it is rotating. As is best seen in FIG. 7, the bottom outside of the cooking vessel 41 has a series of flanges or projecting sites 46 radiating from the geometric center of the vessel bottom 43. As a result, these projecting sites encompass indented areas within the vessel bottom that, when the cooking vessel is in place on the cooker, engage with drive segments 17 mounted on drive cup 16. (FIG. 4).

Figure 15:
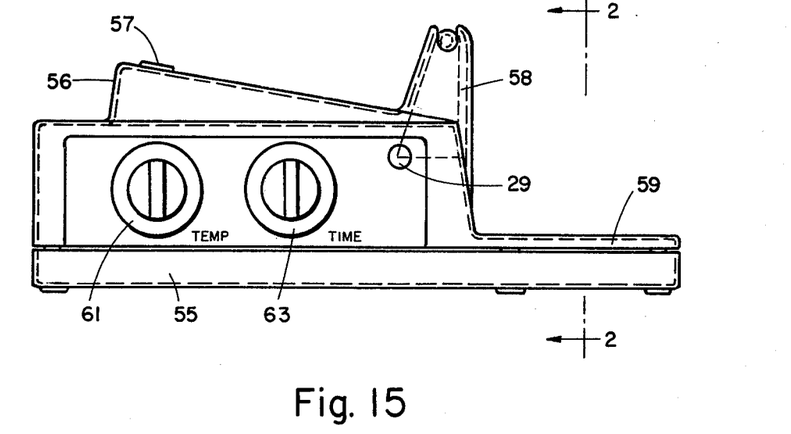
FIG. 15, is a further embodiment of the cooker control system housing, side elevational view.
Figure 16:
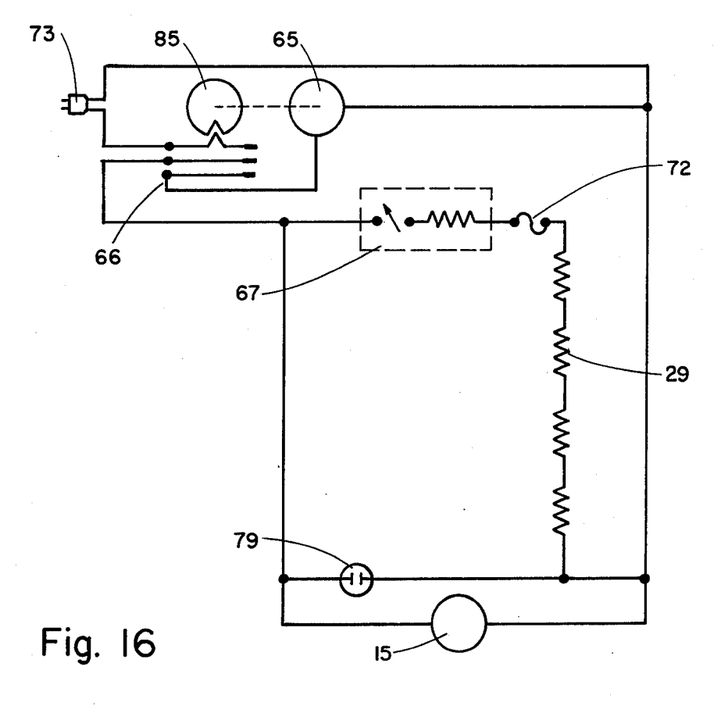
FIG. 16, is a block circuit diagram for cooking control in the cooker illustrated in FIG. 1

All of the above components are mounted on control system housing 55 through adjustable verticle support 58 as shown in FIG. 1. This support allows the cooking vessel/housing to be lowered typically by means of a handle 84 from the verticle (for filling) to the inclined position (for cooking), resting on vessel support 57 formed on cooker positioning means 56. It can be raised again typically by using handle 84 to the verticle at the termination of the cooking cycle. This housing 55 in the embodiment of FIG. 1 contains a microprocessor for controlling the cooking time as shown in application Ser. No. 124,091, filed Feb. 25, 1980. A further embodiment of this control housing is shown in FIG. 15, the electronics of such are illustrated in FIG. 16. Referring to the operation of the embodiment of FIGS. 15 and 16, after setting the temperature dial 61, the timer 65 is actuated by turning timer dial 63. This closes switch 66 allowing current to flow (and the power on/off light 79 to glow) through the (variable resistance) heat control 67 connected to the temperature dial 61 and the timer motor 65. Current also flows to the heaters 29 and drive motor 15 rotating the vessel and causing the heater elements to activate. The timer motor 65 has internal timer cam 85 which rotates as the motor runs thereby closing switch 66 to complete the heater circuit, turning on the heater elements 29. As the cam 85 continues its rotation, the switch 66 opens and the elements 29 are off. This combination (timer, motor, switch and heater elements) acts as a cycling device which cycles the heaters in an on/off manner until the set time terminates. As shown, the heat control 67 with heater elements and drive motor 15 are an independant but parallel circuit so that the heaters can cycle on and off while the drive motor remains on, i.e., the vessel rotates.

In operation, the vessel 11 is first filled with the materials to be cooked, the lid attached by inserting such within elastomeric sealing ring 51 and transferred to the cooker typically by means of carrying the vessel by vessel flange 44, where it is positioned on the cooker vessel drive cup 16, the indented areas on the bottom of the vessel engaging the multiple projections from the drive cup. The swing arm 53 is rotated into position whereby the pivot plate lid contact projection 32 engages the pivot plate accepting means 52 on lid 50. The vessel is lowered pivoting about housing support pin 83 so that the housing 10 rests on support 57 of control housing 55. After setting the temperature dial 61, the timer dial 63 is turned to the desired time for cooking, which actuates the drive motor 15 and the heater means 12. When the quantity of heat as set by the time/temperature combination has been added to the vessel (and the food to be cooked), the vessel is raised to the verticle by pivoting upwardly about housing support pin 83, the swing arm rotated away from the disengagement with the lid and the vessel removed from the cooker.

From the above detailed description of the apparatus of this invention, it will be apparent that there is provided an automatic cooker which makes possible the preparation of a wide range of foods in a fail-safe manner. The resulting foods have been found to be equal or superior to the same foods cooked in the more traditional manner. Thus, the preparation of a single dish or entire meal by the cooker of this invention can be done in an automatic manner.

It will be seen that the objects set forth above, among those made apparent from the preceding descriptiton, are efficiently attained and, since certain changes may be made in the above constructions without departing from the scope of the invention, it is intended that all matter contained in the above description or shown in the accompanying drawings shall be interpreted as illustrative and not in a limiting sense.

We claim:
1. In an automatic food cooker including a rotatable cooking vessel having an open end and a closed end, driving means for rotating the vessel, a lid for closing the open end of the vessel, a housing for containing the driving means and supporting the vessel, means carried by the housing for heating the vessel, and means for controlling the temperature of the heat applied to the vessel, the improvement comprising:
 (a) a pivot assembly carried by the housing for engaging the lid of the vessel and securing the vessel in position on the housing for rotation by the driving means; and
 (b) means carried by the lid for engagement with the pivot assembly to permit rotation of both the lid and the vessel with respect to the pivot assembly.
2. The automatic food cooker of claim 1 further including:

(a) a mounting plate disposed in the housing for supporting the driving means;
(b) a drive cup carried and driven by the driving means for receiving the closed end of the cooking vessel;
(c) a plurality of drive segments carried by the drive cup for engaging the closed end of the vessel; and
(d) means carried by the closed end of the vessel for engagement by the drive segments to rotate the vessel by the driving means.

3. The automatic cooker of claim 1 wherein the temperature controlling means further includes means for programming and controlling the heating means over an elapsed time for supplying a predetermined quantity of heat to the cooking vessel over a predetermined period of time.

4. The food cooker in accordance with claim 3 wherein said means for programming and controlling the heating means over an elapsed time comprises timer means and duty cycling means.

5. The food cooker in accordance with claim 1 wherein the axis of rotation of said cooking vessel form an acute angle with respect to the horizontal and the vessel lid means is elevated with respect to end of the vessel opposite the open end thereof.

6. The food cooker in accordance with claim 5 wherein said acute angle is varied relative to the contents of said cooking vessel wherein said contents coat the entire inner wall of said vessel when rotating.

7. The food cooker in accordance with claim 5 wherein said vessel rotates symmetrically about its axis of rotation.

* * * * *